INVENTOR.
Werner Donne
BY W. Bayard Jones
Attorney

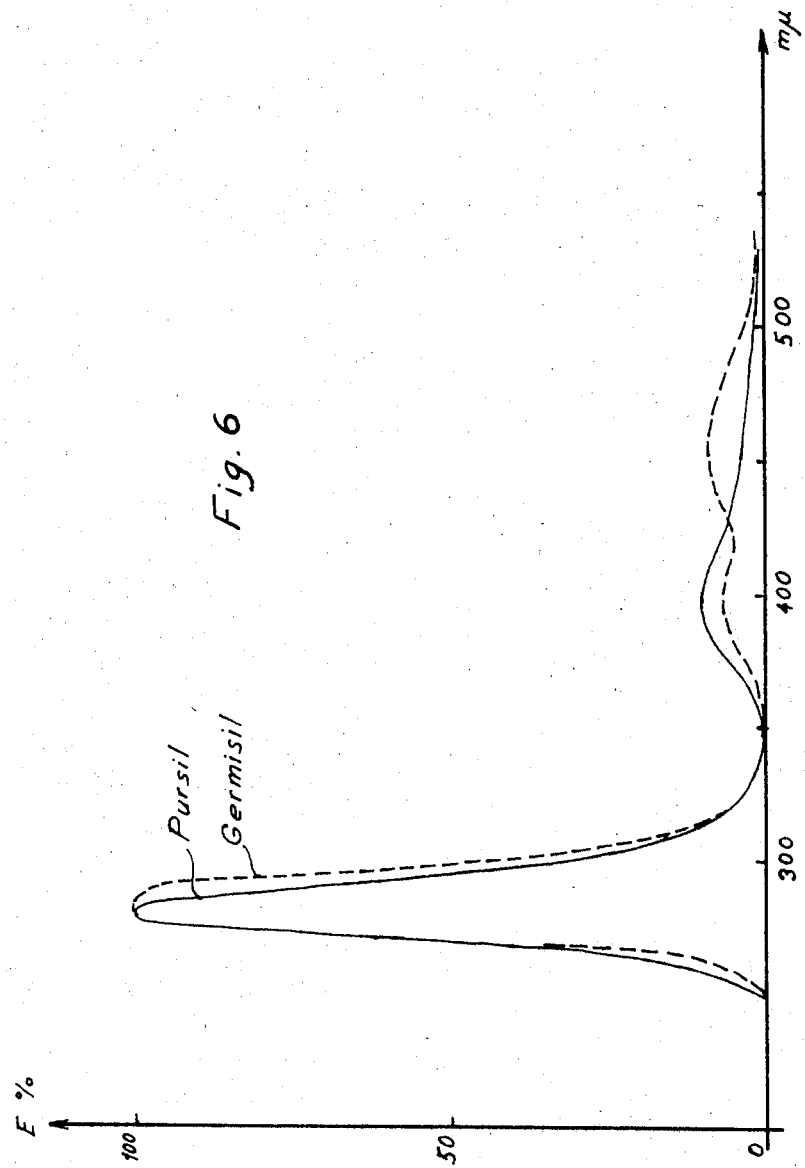

United States Patent Office 3,426,194
Patented Feb. 4, 1969

3,426,194
FLUORESCENCE RADIATION DEVICE RADIATING AT 280 mµ WAVE LENGTH, AND METHOD OF MAKING SAME
Werner Donne, Alvsjo, Sweden, assignor to LKB-Produkter Aktiebolag, Stockholm, Sweden, a joint-stock company of Sweden
Filed Mar. 31, 1965, Ser. No. 444,344
Claims priority, application Sweden, Apr. 16, 1964, 4,722/64
U.S. Cl. 250—71     4 Claims
Int. Cl. G01n 21/38; H01j 1/63

ABSTRACT OF THE DISCLOSURE

A fluorescent radiation device for producing radiation of 280 mµ comprises an elongate light guiding member or rod of a special silicon dioxide glass, and a mercury vapor gas discharge device located adjacent the smooth side surfaces thereof. The light guiding member has a fluorescent characteristic with respect to a wave length of 280 m/µ which is substantially the same as that provided by a silicon dioxide glass of greater than 99% purity which has been exposed to gamma radiation. Two examples of a material having suitable characteristics are glasses manufactured by the French company, Quartz and Silice and sold under the names of Pursil and Germisil, respectively. A satisfactory material can also be made by subjecting 99% pure silicon dioxide glass to neutron radiation.

---

The present invention is related to a fluorescent radiation device and particularly a device producing an incoherent fluorescence radiation within a very narrow and accurately determined range of wave lengths. Particularly the invention relates to a fluorescence radiation device producing an incoherent radiation substantially with the wave length of 280 mµ.

In several scientific and technical applications a radiation source is required, which produces a radiation as monochromatic as possible and having an accurately predetermined wave length. This is the case for instance for photometrical analyses on albumines, where an ultraviolet radiation with a wave length of 280 mµ is required. There exist in principle two different methods of producing such a radiation source. According to the one method, one can by means of filter devices separate the radiation with the desired wave length from a radiation source, usually a gas discharge lamp, having a spectrum of radiation comprising the desired wave length. If the radiation source does not have a maximum at the desired wave length, however, very efficient and consequently expensive filter devices are required for selecting the radiation with the desired wave length from the radiation spectrum of the radiation source. This is for instance the case when one tries to separate a radiation with a wave length of 280 mµ from the total radiation from a mercury discharge lamp, as the radiation spectrum from the mercury discharge lamp has very pronounced maximum at the wave length 254 mµ, due to which it is very difficult and requires expensive filter devices to separate the desired, comparatively small radiation with the wave length 280 mµ from the very strong radiation with the wave length 254 mµ.

The second method of producing a radiation with a predetermined desired wave length is to use a fluorescent substance, which when excited by a certain radiation produces a fluorescence radiation having a spectrum comprising the desired wave length and preferably having a maximum at the desired wave length. In previously used fluorescence radiation sources of this type a powdered fluorescent substance is generally applied as a layer on the outer or the inner side of a transparent cover of the exciting radiation source, which consists normally of a gas discharge lamp. In certain cases the powdered fluorescent substance is instead applied as a layer on an additional transparent wall disposed outside and around the exciting radiation source. This prior type of fluorescence radiation source has, however, several serious disadvantages. Thus, for instance, the fluorescence radiation from a fluorescent substance is normally comparatively weak wherefore a considerable amount of fluorescent substance is required, if a large quantity of radiation is to be obtained. A large amount of fluorescent substance requires, however, that the surface on which the powdered fluorescent substance is applied as a layer is correspondingly large, due to which the fluorescent radiating surface becomes large and the radiation intensity small. In most cases, however, it is desired to achieve a large radiation intensity rather than a large total quantity of radiation, in which case, however it is very difficult to collect the radiation from a large radiant surface in such a way that a large radiation intensity is obtained. Another serious disadvantage of the fluorescence radiation sources of this type is that it cannot be avoided that a considerable portion of the exciting radiation penetrates the layer of fluorescent substance and the transparent wall on which this layer is applied, wherefore the exciting radiation will be mixed with the desired fluorescence radiation. As the exciting radiation is much stronger than the fluorescence radiation, it is technically difficult and requires expensive devices to separate the desired fluorescence radiation with the desired wave length from the stronger, exciting radiation. This is of course particularly the case, if the exciting radiation comprises a radiation maximum close to the wave length of the desired fluorescence radiation. Still another disadvantage of the prior type fluorescence radiation source is that the fluorescent layer of powdered fluorescent substance has normally a comparatively limited effective time of life.

The object of the present invention is therefore to provide a fluoresence radiation source for incoherent radiation, in particular a fluoresence radiation source for radiation within a predetermined, narrow wave length range and particularly for a radiation with a wave length of 280 mµ, which fluorescence radiation device does not have the abovementioned disadvantages. With this object the invention provides a fluorescence radiation device for incoherent radiation, comprising a fluorescence substance and a radiation source for producing a radiation capable of exciting the fluorescent substance to fluorescence. The fluorescent radiation device according to the invention is characterized in that the fluorescent substance is transparent to the exciting radiation as well as to the desired portion of the fluorescence radiation emitted by the substance and is in the shape of a light guiding member arranged to guide a substantial portion of the fluorescence radiation emitted by the fluorescent substance within the light guiding member through total reflections in the side surfaces of the light guiding member to the two end surfaces of the member and to permit a substantially reflection-free exit of the fluorescence radiation through at least one of said end surfaces, the exciting radiation source being arranged to irradiate the light guiding member substantially perpendicularly to the light guiding direction of the member with such an intensity that only a spontaneous emission is effected in the fluorescent substance.

The means for exciting the fluorescent substance to fluorescence is preferably a radiation source arranged to expose the light guiding member to a radiation capable of exciting the fluorescent substance to fluorescence.

In the fluorescence radiation device according to the invention the desired fluorescence radiation will be emitted throughout the entire body of the light guiding member and by increasing the dimensions of the light guiding member is is consequently possible to increase the total quantity of fluorescence radiation in a corresponding degree. Due to the light guiding properties of the light guiding member, the major portion of the fluorescence radiation emitted within the light guiding member will be total-reflected in the side surfaces of the light guiding members and consequently guided in the longitudinal direction of the light guiding member to the two end surfaces of the member, through which a fluorescence radiation of high intensity will emerge. Preferably, one end surface of the light guiding member is substantially total-reflecting or disposed close to a mirror, whereby an additional increase of the radiation emerging through the opposite end surface of the light guiding member and thus the radiation intensity at this end surface will be attained. As the fluorescence radiation is guided within the light guiding member and will travel a substantial distance within the member, the fluorescent substance in the light guiding member must of course have as small an attenuation as possible for the desired wave length range of the fluorescent radiation. Furthermore, the ffuorescent substance in the light guiding member should also have a small attenuation for the exciting radiation so that fluorescence will be created throughout the entire body of the light guiding member.

The exciting radiation source is preferably so disposed relative to the light guiding member that the exciting radiation is substantially perpendicular to the light guiding direction of the light guiding member. In this way the exciting radiation will pass, substantially completely, straight through the light guiding member in a direction perpendicular to the light guiding direction of the member, whereby no or only an insignificant portion of the exciting radiation will be included in the fluorescence radiation emerging through the one end surface of the light guiding member. In a fluorescence radiation device according to the invention there exists consequently no problem of separating the desired fluorescence radiation from the exciting radiation.

With the invention it is possible to obtain a substantially unlimited effective time of life for the fluorescent substance, wherefore the effective time of life of the fluorescence radiation device according to the invention will be determined by the effective time of life of the exciting radiation source.

As already mentioned, a particular object of the invention is to provide a fluorescence radiation device having a radiation with the wave length 280 m$\mu$, which can be used for instance for analyses on albumines. According to the invention a radiation with this wave length can be produced, if in a fluorescence radiation device according to the invention the light guiding member consists of a silicondioxide glass. Silica glass, often improperly called quartz glass, consists substantially completely of pure silicondioxide with a very small amount of impurities. $SiO_2$-glass of good quality comprises normally more than 99.9% of $SiO_2$ and often more than 99.8%. Silicondioxide glass is commercially available in a completely transparent grade, manufactured from rock crystal, and in a more opaque grade containing very small gas bubbles, reducing the translucency of the glass, which grade is manufactured from quartz sand. In the fluorescence radiation device according to the invention silicondioxide glass of the completely clear grade is preferably used in order to obtain the smallest possible attenuation of the fluorescence radiation and of the exciting radiation.

It is already known that most commercial silicondioxide glasses have a certain fluorescence within the ultraviolet range when exposed to the radiation from a mercury discharge lamp. It is believed that it is primarily the radiation with the wave length 254 m$\mu$ from the mercury discharge lamp which is exciting the silicondioxide glass to fluorescence. The use of silicondioxide glass for the light guiding member in a fluorescence radiation device according to the invention in order to obtain a radiation with the wave length of 280 m$\mu$ is based on the new discovery that the fluorescence radiation from conventional silicondioxide glass irradiated by a mercury discharge lamp or any other radiation source capable of exciting silicondioxide glass to fluorescence within the ultraviolet range comprises two pronounced maxima of radiation, one comparatively narrow maximum at 280 m$\mu$ and a second considerably broader maximum at about 400 m$\mu$. The ratio between the amplitudes of these radiation maxima varies for different commercial qualities of silicondioxide glass, which have been tested, and varies also from one sample to another of the same glass. In many cases the intensity of the radiation with the wave length 400 m$\mu$ is considerably larger than the intensity of the radiation with the wave length 280 m$\mu$. As, however, the two radiation maxima are well spaced from one another, it is possible to separate by means of comparatively simple filter means the desired radiation with the wave length 280 m$\mu$ from the fluorescence radiation emerging from the one end surface of the light guiding member. Some commercial qualities of silicondioxide glass have been found, however, for which the radiation at 280 m$\mu$ is considerably larger than the radiation at 400 m$\mu$. FIG. 6 in the enclosed drawing is a diagram showing the relative intensity of radiation as a function of the wave length for two different commercial qualities of silicondioxide glass, called "Germisil" and "Pursil" respectively, which are manufactured and sold by the French company, Quartz & Silice. For both materials the curves show the intensity of the radiation at a given wave length in percent of the intensity of radiation at 280 m$\mu$.

As pure silicondioxide does not display any fluorescence, when exposed to the radiation from a mercury discharge lamp, it is reasonable to assume that the fluorescence of silicondioxide glass is due to the very small amount of impurities, of the order of 0.1 percent and less, which are contained in commercial silicondioxide glass. Chemical and spectrographical analyses of those commercial grades of silicondioxide glass, for which the fluorescence radiation spectrum has been analysed, have not, however, given any definite answer as to which impurities may be causing the different portions of the fluorescence radiation spectrum of the silicondioxide glass. In order to find out this, if possible, test pieces of silicondioxide glass were manufactured by the Vernoel process while deliberately adding various impurities, whereafter the fluorescence radiation spectra of the manufactured test pieces were determined with the test pieces exposed to the radiation from a mercury discharge lamp. These tests could certainly not give any accurate, quantitative results, as it was not possible to determine accurately the amount of added substance and nor whether these were contained in the manufactured silicondioxide glass in their pure original form or as some chemical compositions, for instance some oxides formed in the hydrogen-oxygen flame used for the manufacture of glass. Furthermore, the manufactured glass pieces contain an uncontrollable amount of very small gas bubbles, which affected the attenuation of the exciting radiation as well as the fluorescence radiation within the light guiding member in an unknown degree. Furthermore, it is extremely difficult to manufacture several light guiding members with exactly equal light guiding properties, i.e. primarily the same reflecting properties of the reflecting side surfaces. The tests gave, however, certain qualitative results and showed that primarily impurities in the silicondioxide glass of elements having diamond crystal structure seem to cause a fluorescence of the silicondioxide glass when this is exposed to the radiation from a mercury discharge lamp.

From silicondioxide glass manufactured according to the Vernoel method from powdered silicondioxide and without any other substances deliberately added a fluorescence radiation spectrum was obtained having a very pronounced radiation maximum at about 400 m$\mu$ and a comparatively small radiation maximum at about 280 m$\mu$. The ratio between the magnitudes of the 400 m$\mu$ maximum and the 280 m$\mu$ maximum was larger than 100.

Silicondioxide glass manufactured in this way but with an addition of tin showed a very pronounced fluorescence maximum at 400 to 420 m$\mu$. This fluorescence maximum was strikingly larger than in the earlier test sample of silicondioxide glass without any added substance. Whether silicondioxide glass containing added tin has any fluorescence at the wavelength 280 m$\mu$ could not be determined, as the glass was non-transparent for wave lengths below about 350 m$\mu$.

A silicondioxide glass sample containing an added amount of germanium showed a pronounced fluorescence maximum at about 390 m$\mu$ and a somewhat smaller fluorescence maximum at about 290 m$\mu$. The ratio between the magnitudes of the two fluorescence maxima varied with the amount of added germanium, but the maximum at 290 m$\mu$ for the manufactured samples had a magnitude of about 25 to 75% of the magnitude of the 390 m$\mu$-maximum.

A sample of silicondioxide glass with added indium showed a single fluorescence maximum at about 360 m$\mu$.

Though the above described tests give a possible explanation to the pronounced and comparatively broad radiation maximum in the fluorescence radiation spectrum which has been found at about 400 m$\mu$ for all commercial qualities of silicondioxide glass, which have been tested, no definite answer is obtained as to the cause of the pronounced, but in some cases somewhat smaller radiation maximum at 280 m$\mu$, which has been found in the radiation spectrum of almost all commercial qualities of silicondioxide glass which have been tested. This maximum might, at least partially, be due to the presence of germanium in the glass. A radiation maximum at 280 m$\mu$ has, however, been found also in silicondioxide glasses, which according to chemical and spectographic analyses do not contain any germanium. The hypothesis was then made that the radiation maximum at 280 m$\mu$ in the fluorescence radiation spectrum might be caused by the presence of pure, atomic silicon solved in the silicondioxide glass, which silicon could not be detected by chemical or spectrographic analyses. In order to test this hypothesis it was, of course, impossible to manufacture a sample of pure silicon, as it could not be guaranteed that the pure silicon supplied to the hydrogen-oxygen flame would be contained in the silicondioxide glass in elementary form. Quite on the contrary, it is probable that the silicon powder should be converted in the flame to siliconoxide or silicondioxide.

Instead the hypothesis was tested by dipping a heated rod of silicondioxide glass in silicon powder. Some of the silicon grains stuck to the heated silicondioxide glass rod and the fluorescence radiation from these points was analysed. It was then found that the fluorescence radiation from those points of a silicondioxide glass rod, where silicon grains had stuck to the surface of the rod, contained a considerably stronger radiation maximum at the wave length 280 m$\mu$ than the fluorescence radiation from other points on the surface of the silicondioxide glass rod. This test confirmed consequently the hypothesis that the radiation maximum at the wave length 280 m$\mu$ in the fluorescence radiation spectrum of most qualities of silicondioxide glass might be caused by the presence of pure atomic silicon in the silicondioxide glass.

If the hypothesis was correct, it should consequently be possible to achieve a desired increase of the fluorescence radiation with the wave length of 280 m$\mu$ by reducing some of the silicondioxide in the glass to atomic silicon. It is already known that certain oxide molecules, as for instance $H_2O$, can be decomposed into their atomic constituents by X-ray radiation and neutron radiation. Therefore a sample of a commercial silicondixode glass was exposed to $\gamma$-radiation and its fluorescence radiation spectrum was measured before as well as after the $\gamma$-irradiation. It was found that the ratio between the magnitudes of the fluorescence radiation maxima at 280 m$\mu$ and 400 m$\mu$ before the $\gamma$-irradiation was 1:10, whereas after the $\gamma$-irradiation the same ratio was 3:1. A pronounced increase of the ratio between the magnitude of the 280 m$\mu$ maximum and the magnitude of the 400 m$\mu$-maximum was consequently achieved by exposing the silicondioxide glass to a $\gamma$-radiation. The change in the radiation spectrum seemed primarily to be due to an increase of the absolute magnitude of the fluorescence radiation with the wave length 280 m$\mu$, but also to a certain degree a somewhat reduced fluorescence radiation with the wave length 400 m$\mu$.

A corresponding test was made by exposing a silicondioxide glass sample to a neutron radiation and by measuring the fluorescence radiation spectrum of the sample before as well as after the neutron irradiation. No significant change of the ratio between the magnitudes of the radiation maxima at 280 m$\mu$ and 400 m$\mu$ could be observed due to the neutron irradiation. On the other hand, however, the neutron irradiation caused a very pronounced increase of the fluorescence radiation at the wave length 280 m$\mu$ as well as the wave length 400 m$\mu$. The increase of the fluorescence radiation at these two wave lengths due to the neutron irradiation was estimated to be of the order 3 to 4 times.

Certain qualities of silicondioxide glass are blackened, more or less, by both the $\gamma$-irradiation as well as the neutron irradiation. This blackening can, however, be removed very easily by heating the glass after the $\gamma$- or neutron irradiation respectively to above 350° C. or by exposing the silicondioxide glass to an ultraviolet radiation.

The amount of impurities necessary in the silicondioxide glass in order to cause fluorescence of the glass is extremely small, as already explained. A suitable concentration of impurities should be smaller than 1% and is preferably smaller than 0.1%. A too large concentration of certain impurities can have the disadvantage that the glass becomes untransparent at least for certain wave lengths.

A light guiding member for a fluorescence radiation device according to the invention having a radiation with the wave length of 280 m$\mu$ can consequently be obtained by manufacturing the light guiding member from silicondioxide glass and exposing the light guiding member to a $\gamma$-radiation and/or a neutron radiation and subsequently removing any blackening of the silicondioxide glass caused by the $\gamma$-irradiation or the neutron irradiation respectively by heating the light guiding member, preferably to about 350° C., or exposing it to an ultraviolet radiation.

It is obvious, however, that the above described treatment of a light guiding member of silicondioxide glass is not always necessary in order to produce a fluorescence radiation comprising a pronounced radiation with a wave length of 280 m$\mu$, as certain commercial qualities of silicondioxide glass have already, without any such treatment, a pronounced radiation maximum at 280 m$\mu$ (compare FIG. 6).

In the drawings:

FIG. 6 is a graph showing the spectral distribution of two of the preferred materials.

Figure 1:
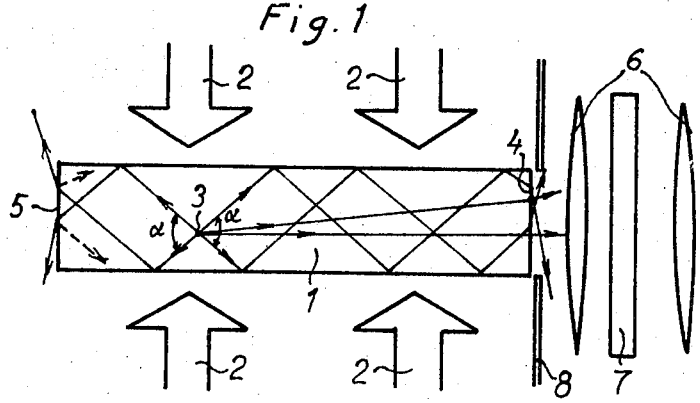
FIG. 1 is a diagram illustrating the principles of my invention.

As shown in FIG. 1 the fluorescence radiation device according to the invention comprises a light guiding member 1 made of a material capable of emitting, when excited by a certain radiation, a fluorescence radiation comprising the wave length or wave length range which is desired. The material in the light guiding member 1 must be as transparent as possible, that is have a small attenuation, both for the desired fluorescence radiation as well as for the exciting radiation. In FIG. 1 the light guiding member is shown, for the sake of simplicity, as a straight rod, which is so disposed relative to the excitation radiation source in the fluorescence radiation device that the exciting radiation 2 is substantially perpendicular to the longitudinal direction of the light guiding member, that is, to the light guiding direction in the member.

The exciting radiation 2 penetrates consequently the light guiding member 1 substantially perpendicularly to the light guiding direction and as a consequence a fluorescence radiation will be emitted within the entire body of the light guiding member. The fluorescence radiation from a point 3 within the light guiding member having a direction within an angle $\alpha$ (FIG. 1) will, according to the well-known theory for light guiding members, reach the two end surfaces of the light guiding member either directly or after one or several total reflections in the side surfaces of the member and is consequently guided to the two end surfaces 4 and 5 of the member and will emerge from the member through these end surfaces. The portion of the fluorescence radiation having a larger angle of incidence with respect to the side surfaces of the light guiding member will leave the light guiding member through the side surfaces. Consequently, a very large portion of the total fluorescence radiation emitted within the light guiding member will emerge through the two end surfaces 4 and 5 of the light guiding member, whereby a fluorescence radiation having a considerable intensity will be attained at these end surfaces.

As the exciting radiation 2 is substantially perpendicular to the light guiding direction of the light guiding member, that is perpendicular to the side surfaces of the light guiding member, the radiation emerging through the end surfaces 4 and 5 of the light guiding member will contain no or only a very insignificant amount of exciting radiation.

The fluorescence radiation emerging from the one end surface 4 of the light guiding member can for instance, as shown in the drawing, be collected by means of any suitable conventional lens system 6 and directed towards a point of use. If only a certain wave length of a certain wave length range of the total fluorescence radiation is desired, this wave length or wave length range respectively can be separated from the total fluorescence radiation by means of a suitable filter 7. At this end of the light guiding member some sort of a screen 8 is preferably arranged to prevent the exciting radiation 2 from reaching the lens system 6. In certain cases, however, no lens system is required but a simple diaphragm disc screening two divergent portions of the radiation emerging through the end surface may be sufficient.

In order to increase the intensity of the fluorescence radiation emerging through the one end surface 4 of the light guiding member 1, the opposite end surface 5 may preferably be reflecting or disposed close to a mirror so that the fluorescence radiation, which is guided by the light guiding member to this end surface 5, is reflected back into the light guiding member as indicated with dotted lines, so as to be guided to the exit end 4 of the light guiding member. In this way an additional increase of the fluorescence radiation emerging through the end surface 4 of the light guiding member is achieved.

It is obvious that it is essential for the invention that the reflecting side surfaces of the light guiding member 1 are very smooth so that they have a well-defined reflection and that the total-reflection angle is as large as possible. If the light guiding member consists of silicondioxide glass and is disposed in air, the angle $\alpha$ is about 96°. On the other hand, however, it (FIG. 1) is of course not necessary that the light guiding member is in the shape of a straight rod, as a light guiding member is capable, as is well known, to guide light within itself to the two end surfaces of the member, even if the light guiding member is curved or twisted.

It is to be observed that a device according to the invention is not to be mistaken for a laser. In a laser the laser element must be a straight rod, which is disposed in an optical resonance cavity formed by two exactly plane-parallel mirrors disposed at opposite ends of the laser element and at a very accurately predetermined mutual distance. One of said mirrors must be semi-reflecting. Furthermore, the excitation (pumping) of the laser element must have such a high intensity that an inversion between two energy levels for the active ions in the laser element is achieved and thus the conditions for a stimulated emission are fulfilled, whereby a radiation quanta initially generated by spontaneous emission will, due to the presence of the optical resonance cavity, give rise to a stimulated emission so that an amplified coherent radiation is produced. In a device according to the invention, on the other hand, it is, as mentioned, not necessary that the light guiding member is a straight rod and only one of the end surfaces of the light guiding member can be permitted to be reflecting or disposed close to a mirror. On the other hand, however, the side surfaces of the light guiding member must have a reflection, which is as large and well defined as possible, whereas this is in no way essential for a laser element. In a device according to the invention it is also possible to use a very moderate excitation intensity, which lies far below the pumping intensity necessary for a laser. The device according to the invention produces consequently an entirely conventional fluorescence radiation caused by a spontaneous emission and thus resulting in a normal incoherent radiation.

In FIG. 1 the light guiding member 1 has been shown, for the sake of simplicity, as consisting of a solid, transparent, fluorescent substance. The light guiding member in a fluorescence device according to the invention can, however, also consist of a fluorescent liquid which is transparent to the fluorescence radiation as well as the exciting radiation and which is enclosed in a tube, which is transparent to the exciting radiation and which forms the reflecting side surfaces of the light guiding member constituted by the liquid in the tube.

The exciting radiation source is preferably a gas discharge lamp, which has the advantage that it can be shaped in such a way that the entire surface of the light guiding member is exposed to the exciting radiation, even if the light guiding member is comparatively long.

FIGS. 2, 3, 4 and 5 show schematically some practical embodiments of the fluorescence radiation device according to the invention. For the sake of simplicity these figures show only the light guiding member and the excitation radiation source.

Figure 2:
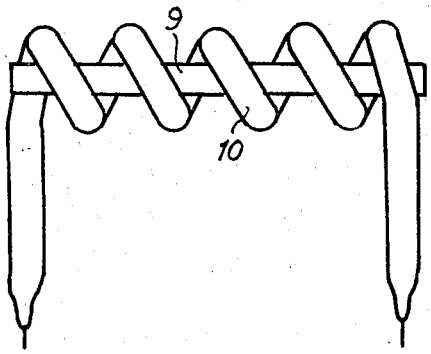
FIG. 2 is a schematic elevation of one embodiment.

In the embodiment of the invention schematically shown in FIG. 2 the light guiding member 9 is an elongated, straight rod, preferably having a circular cross section, whereas the exciting radiation source is a gas discharge lamp 10 helically disposed around the light guiding member 9, whereby the entire cylindrical surface of the light guiding member becomes exposed to the exciting radiation.

Figure 3:
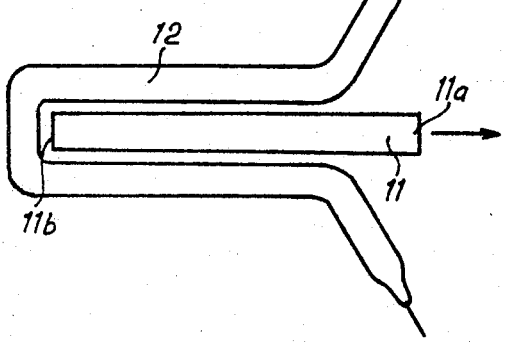
FIG. 3 is a schematic elevation of a second embodiment.

Also in the device according to the invention shown in FIG. 3 the light guiding member is an elongated, straight rod 11 having a circular or rectangular cross section. The exciting radiation source is a gas discharge lamp 12 in the shape of a hairpin, which is disposed with its two legs on opposite sides of and parallel to the light guiding member 11 so that this is exposed to the exciting radiation from both sides. The desired fluorescence radiation is taken out from the outer end surface 11a of the light guiding member 11. The inner end surface 11b of the light guiding member 11 is preferably provided with a layer, which cannot be penetrated by the exciting radiation, or is screened from the gas discharge lamp 12 so that no exciting radiation can enter the light guiding member 11 through this end surface 11b and be guided by the light guiding member to the opposite end surface 11a to emerge from the member together with the desired fluorescence radiation.

Figure 4A:
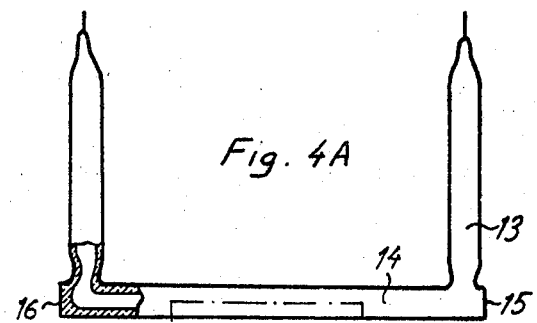
FIG. 4A is an elevation of a third embodiment, partially in section.
Figure 4B:
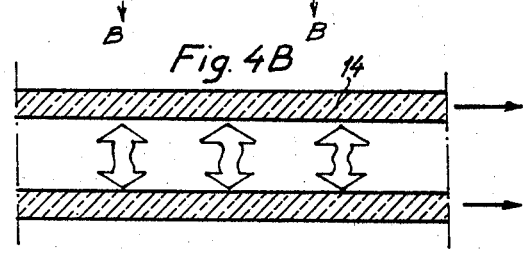
FIG. 4B is a section taken along line B—B of FIG. 4A.

Also in the embodiment of the invention shown in FIGS. 4A and 4B, where FIG. 4B is a sectional view along the line B—B in FIG. 4A, the source of the exciting radiation is a gas discharge lamp 13. This lamp has a comparatively long, straight portion 14 with comparatively thick walls and at least in this portion of the gas discharge lamp the walls consist of a transparent, fluorescent material. The tubular portion 14 of the gas discharge lamp will consequently function as the fluorescent light guiding member and is so designed that both ends 15 and 16 of this tubular portion are free and accessible from the outside. The exciting radiation produced within the portion 14 by the gas discharge in the gas discharge lamp will penetrate the walls of the portion 14 and cause a fluorescence radiation in these walls, which radiation is guided within the walls in the longitudinal direction of the portion 14 towards the two end surfaces 15 and 16, through which the fluorescence radiation is emerging. At the end of the portion 14, where the fluorescence radiation is taken out for use, an effective screen is arranged at the end of the bore of the tube so that no portion of the exciting radiation from the gas discharge within the tube 14 can escape through the end of the portion 14 together with the desired fluorescence radiation.

Figure 5A:
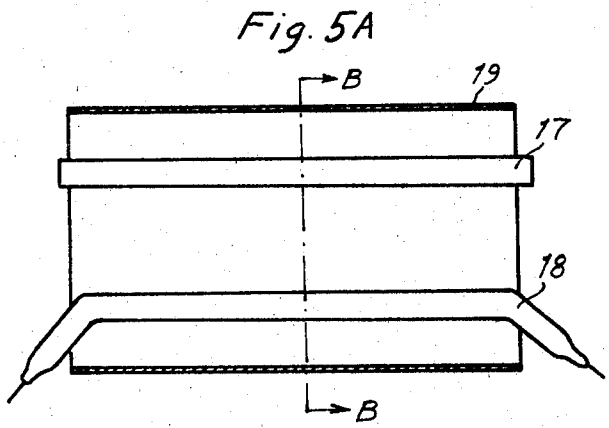
FIG. 5A is a section of a fourth embodiment taken along line A—A of FIG. 5B.
Figure 5B:
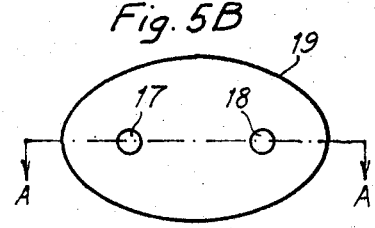
FIG. 5B is a section taken along line B—B of FIG. 5A.

In the embodiment of the invention shown in FIGS. 5A and 5B, where FIG. 5B is a sectional view along the line B—B in FIG. 5A, the light guiding member consists of an elongated rod 17 and the source of the exciting radiation of an elongated gas discharge lamp 18. The light guiding member 17 and the gas discharge lamp 18 are disposed within a cylindrical reflector 19 having an elliptical cross section in such a way that the light guiding member and the gas discharge lamp are located in the focul axes of the reflector 19. In this way the exciting radiation from the gas discharge lamp 18 will by the reflector 19 be concentrated towards the light guiding member 17.

What I claim is:
1. A device for generating an incoherent fluorescent radiation having a pronounced peak of intensity of a wave length of 280 m$\mu$ for photometrical analyses of proteins, comprising:
   an elongated light guiding member of a material comprising silicon dioxide glass
      having a pronounced peak of intensity of radiation at a wave length of 280 m$\mu$ when irradiated by ultra violet light having a wave length of substantially 254 m$\mu$, said light guiding member having smooth side surfaces capable of total internal reflection and
      two end surfaces,
   one of said end surfaces constituing a transparent substantially reflection-free exit of radiation from the interior of the member, and
   means to irradiate said light guiding member with ultra violet light having a wave length of 254 m$\mu$, said means comprising a mercury vapor discharge lamp disposed adjacent to the side surfaces of said light guiding member and irradiating same in directions substantially perpendicular to said side surfaces,
      whereby due to excitation of the silicon dioxide glass in said light guiding member by the radiation from said mercury vapor discharge lamp
      a beam of fluorescent radiation having a pronounced peak of intensity at 280 m$\mu$ will emit from said one end surface of the light guiding member.

2. A device as claimed in claim 1, comprising masking means for masking the radiation from said mercury vapor discharge lamp from said beam of fluorescent radiation emitted from said one end surface of said light guiding member.

3. A device as claimed in claim 1, wherein the opposite end surfaces of said light guiding member is totally reflective towards the interior of the member.

4. A device for generating an incoherent fluorescent radiation having a pronounced peak of intensity of a wave length of 280 m$\mu$ for photometrical analyses of proteins, comprising
   an elongated light guiding member of a material comprising
   silicon dioxide glass
   having fluorescent characteristics substantially the same as that of silicon dioxide glass of a purity in excess of 99% which has been subjected to gamma radiation, said light guiding member
      having smooth side surfaces capable of total internal reflection and
      two end surfaces, one of said end surfaces constituting a transparent substantially reflection-free exit of radiation from the interior of the member, and
   means to irradiate said light guiding member with ultra violet light having a wave length of 254 m$\mu$, said means comprising a mercury vapor discharge lamp disposed adjacent to the side surfaces of said light guiding member and irradiating same in directions substantially perpendicular to said side surfaces,
      whereby due to excitation of the silicon dioxide glass in said light guiding member by the radiation from said mercury vapor discharge lamp
      a beam of fluorescent radiation having a pronounced peak of intensity at 280 m$\mu$ will emit from said one end surface of the light guiding member.

References Cited

UNITED STATES PATENTS

| | | | |
|---|---|---|---|
| 2,225,439 | 12/1940 | Arens et al. | 331—94.5 X |
| 2,314,096 | 3/1943 | Leverenz | 331—94.5 X |
| 2,998,365 | 8/1961 | Custers et al. | 250—106 X |
| 3,134,837 | 5/1964 | Kisliuk et al. | 331—94.5 |
| 3,213,281 | 10/1965 | Neederman | 331—94.5 X |
| 3,308,709 | 3/1967 | Harrick | 88—14 |

OTHER REFERENCES

Radiation Effects in Diamonds, by Schulke, A. A., from Nucleonics, vol. 21, No. 2, February 1963, pp. 68, 69, 70.

ARCHIE R. BORCHELT, *Primary Examiner.*

U.S. Cl. X.R.

88—14; 331—94.5